United States Patent
Mahadik et al.

(10) Patent No.: US 9,602,467 B2
(45) Date of Patent: Mar. 21, 2017

(54) WEB FILTERING WITH INTEGRATED PARENTAL MANAGEMENT AND REPORTING

(71) Applicant: Securly, Inc., Milpitas, CA (US)

(72) Inventors: Vinay Mahadik, Milpitas, CA (US); Bharath Madhusudan, Sunnyvale, CA (US); Paul Katcher, Albany, CA (US); Due Nguyen, San Jose, CA (US); Nikita Chikate, Milpitas, CA (US); Amar Patekar, Santa Clara, CA (US)

(73) Assignee: SECURLY, INC., Milpitas, CA (US)

( * ) Notice: Subject to any disclaimer, the term of this patent is extended or adjusted under 35 U.S.C. 154(b) by 25 days.

(21) Appl. No.: 14/679,536

(22) Filed: Apr. 6, 2015

(65) Prior Publication Data

US 2016/0294775 A1 Oct. 6, 2016

(51) Int. Cl.
*H04L 29/06* (2006.01)
*G06F 17/00* (2006.01)
*G06F 7/04* (2006.01)
*G06F 15/16* (2006.01)
*G06F 17/30* (2006.01)

(52) U.S. Cl.
CPC .......... *H04L 63/0236* (2013.01); *H04L 63/08* (2013.01); *H04L 63/10* (2013.01); *H04L 63/20* (2013.01)

(58) Field of Classification Search
None
See application file for complete search history.

(56) References Cited

U.S. PATENT DOCUMENTS

| | | | |
|---|---|---|---|
| 8,111,154 B1* | 2/2012 | Puri | G08B 21/0202 340/539.13 |
| 8,412,154 B1* | 4/2013 | Leemet | H04M 15/58 455/406 |
| 8,763,078 B1* | 6/2014 | Castellucci | H04L 63/1441 726/1 |
| 8,973,088 B1* | 3/2015 | Leung | H04L 63/00 726/1 |
| 2005/0055578 A1* | 3/2005 | Wright | G06F 21/32 726/4 |
| 2006/0270421 A1* | 11/2006 | Phillips | G08B 21/0236 455/457 |
| 2010/0205662 A1* | 8/2010 | Ibrahim | G06Q 30/00 726/7 |
| 2010/0318642 A1* | 12/2010 | Dozier | H04L 12/66 709/223 |
| 2011/0065419 A1* | 3/2011 | Book | G06F 21/305 455/411 |

(Continued)

*Primary Examiner* — Shin-Hon Chen
(74) *Attorney, Agent, or Firm* — DLA Piper LLP (US)

(57) ABSTRACT

A system and method for web filtering, including: generating an institutional policy dashboard that enables an institution that issued a computing device to a minor user to select a set of institutional web access policies sanctioned by the institution; generating a parental policy dashboard that enables a parent of the minor user to select to a set of parental web access policies sanctioned by the parent; filtering web content accessed by the minor user via the computing device by enforcing the parental and the institutional web access policies; and reporting to the parent a set of web accesses undertaken by the minor user via the computing device.

15 Claims, 12 Drawing Sheets

(56) References Cited

U.S. PATENT DOCUMENTS

| | | | |
|---|---|---|---|
| 2013/0007245 A1* | 1/2013 | Malik | H04L 41/0816 709/223 |
| 2013/0065555 A1* | 3/2013 | Baker | G06Q 20/105 455/410 |
| 2013/0124192 A1* | 5/2013 | Lindmark | G06F 17/274 704/9 |
| 2013/0347058 A1* | 12/2013 | Smith | G06F 21/57 726/1 |
| 2014/0038546 A1* | 2/2014 | Neal | G06Q 10/103 455/405 |
| 2015/0007307 A1* | 1/2015 | Grimes | G09B 5/08 726/18 |
| 2015/0113600 A1* | 4/2015 | Dulkin | H04L 63/10 726/4 |
| 2015/0188949 A1* | 7/2015 | Mahaffey | H04L 63/20 726/1 |
| 2015/0381658 A1* | 12/2015 | Poornachandran | H04L 63/20 726/1 |

* cited by examiner

Activity Log
610

| Record# | Content Category | Geographic Location | Starting Time | Duration |
|---|---|---|---|---|
| 0 | Category C0 | Street Address A0 | Local Time T0 | Duration D0 |
| 1 | Category C1 | Street Address A1 | Local Time T1 | Duration D1 |
| 2 | Category C2 | Street Address A2 | Local Time T2 | Duration D2 |
| n | Category Cn | Street Address An | Local Time Tn | Duration Dn |

WEB FILTERING WITH INTEGRATED PARENTAL MANAGEMENT AND REPORTING

BACKGROUND

Institutions, e.g., schools, can issue computing devices to minor users, e.g., children attending the school. An institution can employ web filtering to limit the web accesses that can be undertaken using the issued computing devices. For example, a school can use web filtering to block social networking sites from being accessed using the computing devices issued to the children attending the school. A child attending a school can take a computing device issued by their school home or to a friend's house and still be subject to the social networking ban by the school.

SUMMARY

In general, in one aspect, the invention relates to a web filtering mechanism. The web filtering mechanism can include: an institutional policy dashboard that enables an institution that issued a computing device to a minor user to select a set of institutional web access policies sanctioned by the institution; a parental policy dashboard that enables a parent of the minor user to select to a set of parental web access policies sanctioned by the parent; and a web filter for filtering a web content accessed by the minor user via the computing device by enforcing the parental and the institutional web access policies.

In general, in another aspect, the invention relates to a method for web filtering. The method can include: generating an institutional policy dashboard that enables an institution that issued a computing device to a minor user to select a set of institutional web access policies sanctioned by the institution; generating a parental policy dashboard that enables a parent of the minor user to select to a set of parental web access policies sanctioned by the parent; and filtering web content accessed by the minor user via the computing device by enforcing the parental and the institutional web access policies.

In general, in yet another aspect, the invention relates to a web filtering mechanism. The web filtering mechanism can include: a web filter for filtering a web content accessed by a minor user via a computing device issued to the minor user by an institution; and a reporting mechanism for reporting to a parent of the minor user a set of web accesses undertaken by the minor user via the computing device.

In general, in still another aspect, the invention relates to a method for web filtering. The method can include: filtering a web content accessed by a minor user via a computing device issued to the minor user by an institution; and reporting to a parent of the minor user a set of web accesses undertaken by the minor user via the computing device.

Other aspects of the invention will be apparent from the following description and the appended claims.

BRIEF DESCRIPTION OF THE DRAWINGS

Embodiments of the present invention are illustrated by way of example, and not by way of limitation, in the figures of the accompanying drawings and in which like reference numerals refer to similar elements.

DETAILED DESCRIPTION

Reference will now be made in detail to the various embodiments of the present disclosure, examples of which are illustrated in the accompanying drawings. Like elements in the various figures are denoted by like reference numerals for consistency. While described in conjunction with these embodiments, it will be understood that they are not intended to limit the disclosure to these embodiments. On the contrary, the disclosure is intended to cover alternatives, modifications and equivalents, which may be included within the spirit and scope of the disclosure as defined by the appended claims. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, have not been described in detail so as not to unnecessarily obscure aspects of the present disclosure.

Figure 1:
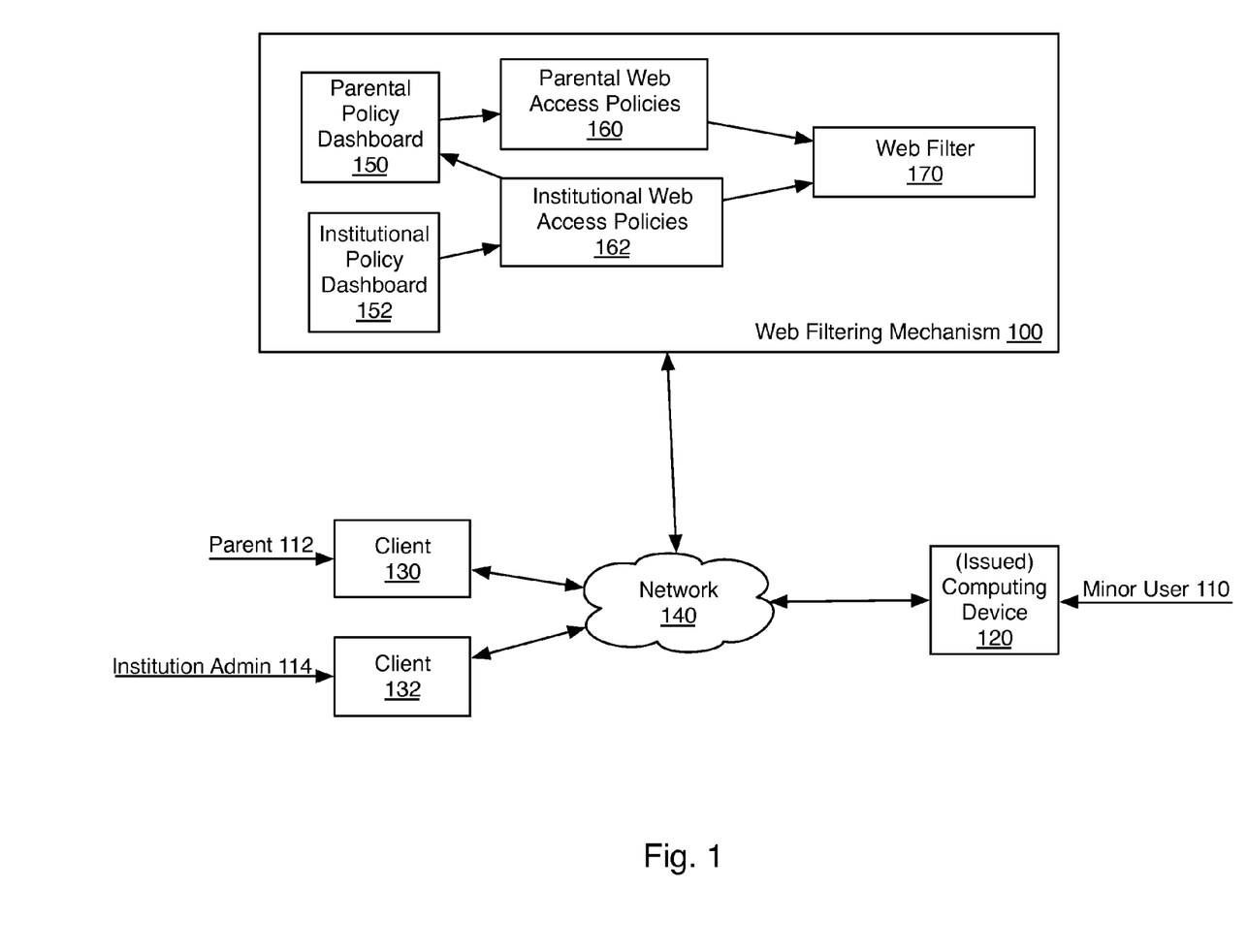
FIG. 1 shows a web filtering mechanism with integrated parental management in one or more embodiments.

FIG. 1 shows a web filtering mechanism 100 in one or more embodiments. The web filtering mechanism 100 filters web communication for a computing device 120 issued to a minor user 110 by an institution. The institution that issues the computing device 120 to the minor user 110 to can be a school and the minor user 110 can be a child attending the school. The web filtering mechanism 100 can perform any kind of web filtering, e.g., DNS filtering, search filtering, keyword filtering, etc.

The web filtering mechanism 100 includes an institutional policy dashboard 152 that enables the institution that issued the computing device 120 to the minor user 110 to select a set of institutional web access policies 162. The institutional web access policies 162 are web access policies sanctioned by the institution that issued the computing device 120 to the minor user 110.

The web filtering mechanism 100 includes a parental policy dashboard 150 that enables a parent 112 of the minor user 110 to select to a set of parental web access policies 160. The parental web access policies 160 are web access policies sanctioned by the parent 112.

The web filtering mechanism 100 includes a web filter 170 for filtering a web content accessed by the minor user 110 via the computing device 120 by enforcing the parental web access policies 160 and the institutional web access policies 162. In one or more embodiments, the web filter 170 enforces the parental web access policies 160 over the institutional web access policies 162 if the parental web access policies 160 and the institutional web access policies 162 conflict.

In one or more embodiments, the institutional policy dashboard 152 can be accessed by an institution admin 114 of the institution that issued the computing device 120 to the minor user 110. The institutional web access policies 162 can apply to groups that can encompass the minor user 110, e.g. a student grade level that encompasses the minor user 110. The parental web access policies 160 apply only to the minor user 110.

The institution admin 114 can access the institutional policy dashboard 152 via a network 140 using a client 132, e.g., a computer or mobile device running a web browser that accesses the web filtering mechanism 100 using web protocols. The parent 112 can access the parental policy dashboard 150 via the network 140 using a client 130, e.g., a computer or mobile device running a web browser.

The web filtering mechanism 100 holds the parental policy dashboard 150 in the same cloud site as the institutional policy dashboard 152. As a consequence, the parent 112 can use the client 130 to access the parental policy dashboard 150 and modify the policies sanctioned by the institutional that issued the computing device 120 to the minor user 110 without having to install any specialized software on the client 130 of the parent 112.

Figure 2:
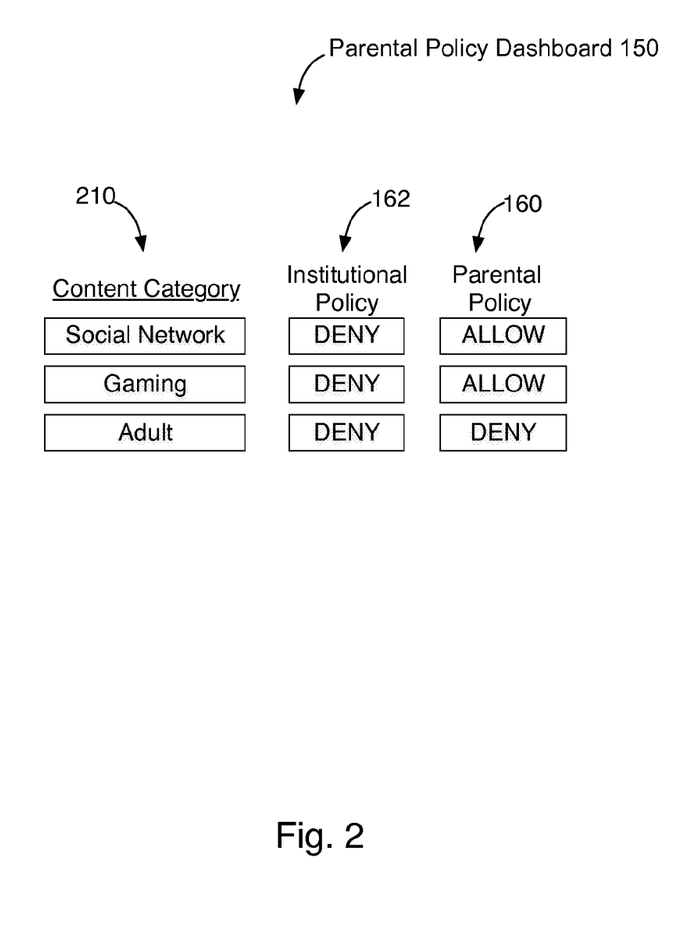
FIG. 2 illustrates a parental policy dashboard in one or more embodiments.

FIG. 2 illustrates the parental policy dashboard 150 in one or more embodiments. The parental policy dashboard 150 includes a set of content categories 210. In this example, the content categories 210 include social networking, gaming, and adult. There can be any number of content categories controllable via the parental policy dashboard 150 and the institutional policy dashboard 152.

The parental policy dashboard 150 lists the institutional web access policies 162 selected by the institution admin 114 via the institutional policy dashboard 152. The institutional web access policies 162 in this example are to deny the social networking, gaming, and adult categories.

The parental policy dashboard 150 enables the parent 112 of the minor user 110 of the computing device 120 to override one or more of the institutional web access policies 162. In this example, the parent 112 has selected via the parental policy dashboard 150 to allow social networking and gaming but to deny the adult category.

Figure 3:
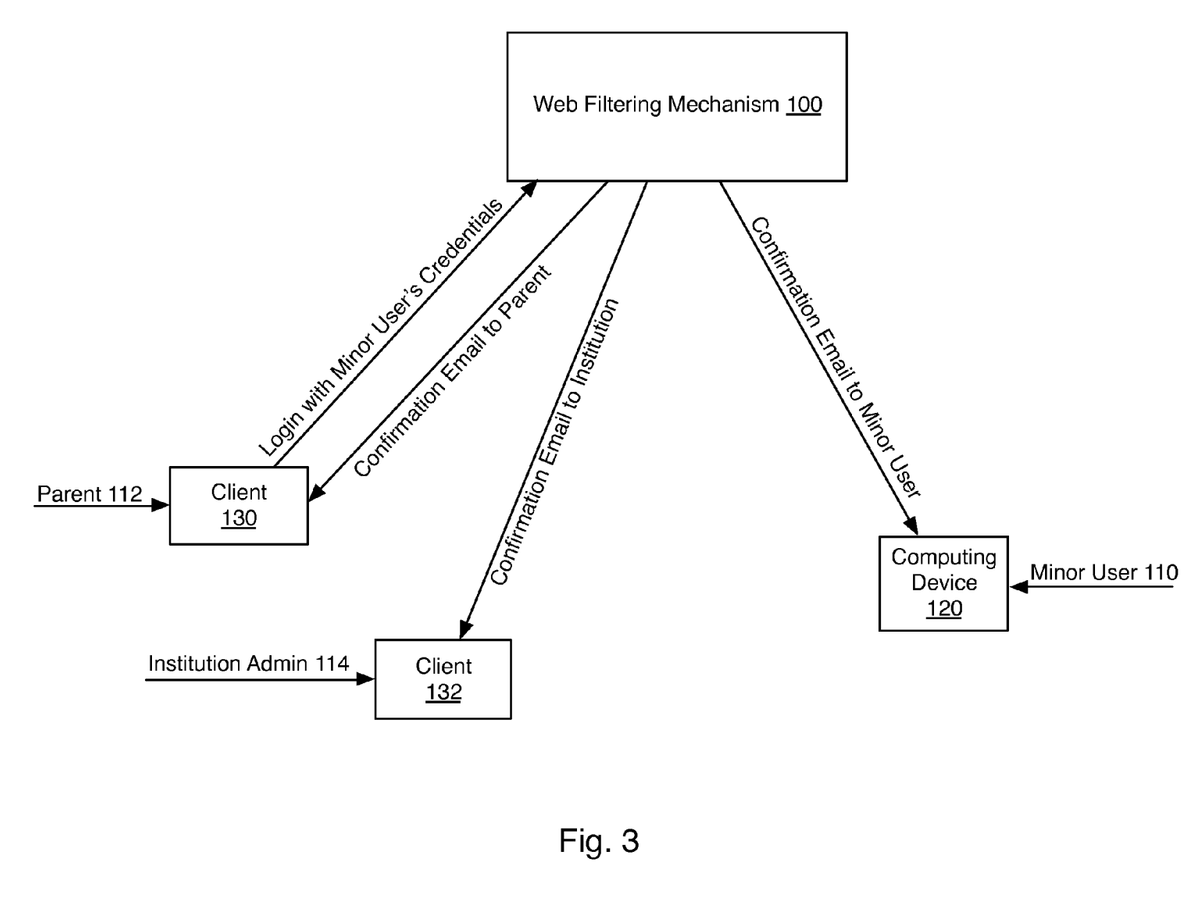
FIG. 3 shows a web filtering mechanism establishing a trust relationship with a parent before allowing the parent to control the web content for a minor user.

FIG. 3 shows the web filtering mechanism 100 establishing a trust relationship with the parent 112 before allowing the parent 112 to access the parental policy dashboard 150. The web filtering mechanism 100 establishes a trust relationship with the parent 112 in one or more embodiments by generating a login page accessible by the client 130 of the parent 112 such that the login page requires the parent 112 to login with a set of credentials that were issued to the minor user 110 by the institution that issued the computing device 120 to the minor user 110. For example, the institution admin 114 can register the login credential issued to the minor user 110 with the web filtering mechanism 100. Thereafter, those credentials can be used by the web filtering mechanism 100 to establish a trust relationship with the parent 112.

The web filtering mechanism 100 sends a respective confirmation email to the minor user 110 and the parent 112 and the institution that issued the computing device 120 to the minor user 110 when the credentials of the minor user 110 are used to login to the web filtering mechanism 100 and access the parental policy dashboard 150. The confirmation emails enable the minor user 110 and the parent 112 and the institution that issued the computing device 120 to detect fraudulent attempts to access the parental policy dashboard 150 by anyone posing as a parent.

In one or more embodiments, the web filtering mechanism 100 can establish a trust relationship with the parent 112 by providing a function in the institutional policy dashboard 152 that enables the institution admin 114 to send a link, e.g., a URL, for the parental control dashboard 150 in an email message to the parent 112. The link can enable the parent 112, and nobody else, to access the parental policy dashboard 150.

Figure 4:
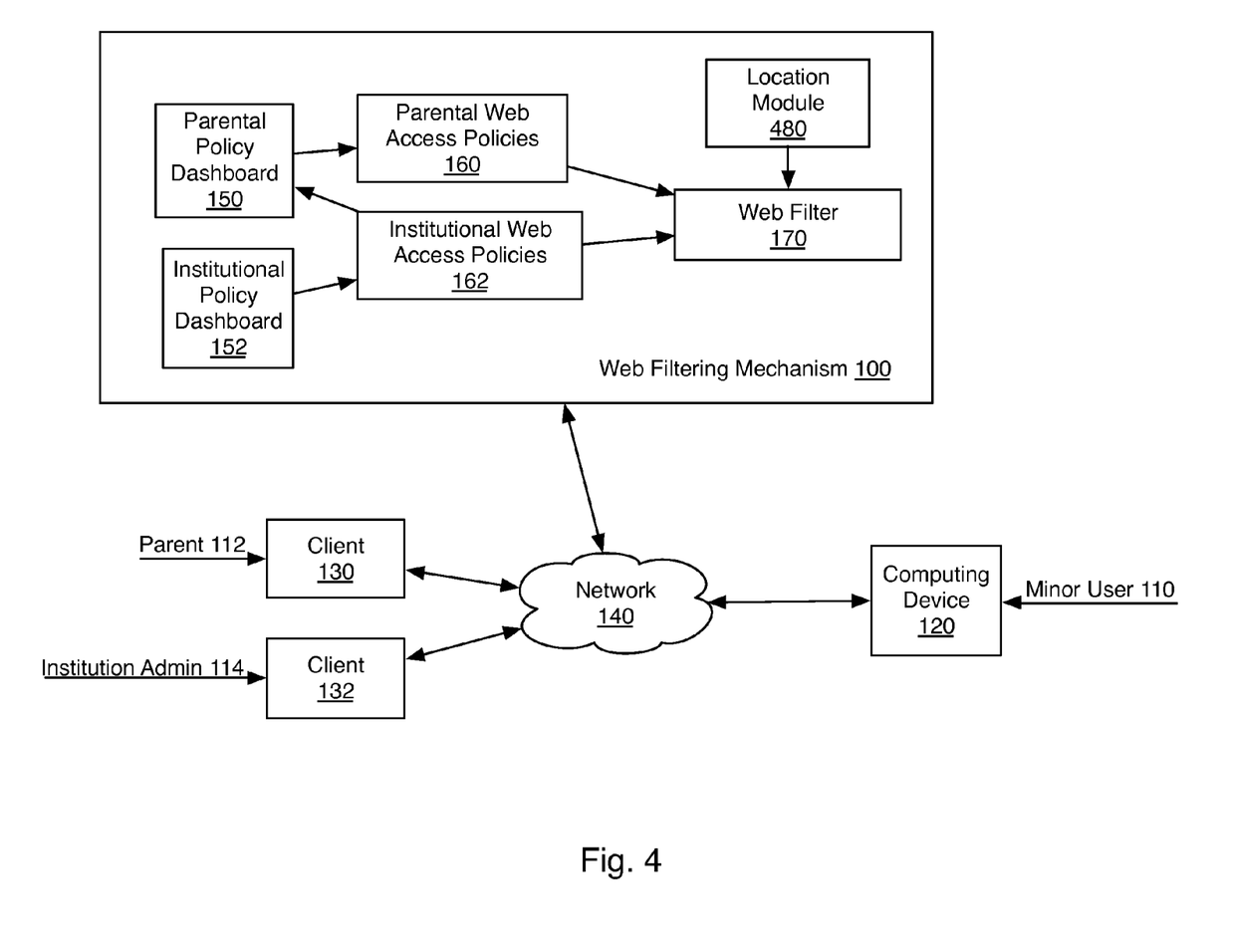
FIG. 4 shows one or more embodiments of a web filtering mechanism that includes a location module.

FIG. 4 shows an embodiment of the web filtering mechanism 100 that includes a location module 480. The location module 480 detects a current geographic location of the computing device 120 and provides the current geographic location to the web filter 170. The location module 480 enables the web filter 170 to adapt web access policies to the current geographic location of the computing device 120. In one or more embodiments, the web filter 170 enforces the institutional web access policies 162 when the geographic location of the computing device 120 is inside the institution that issued the computing device 120 to the minor user 110 and enforces the parental web access policies 160 when the geographic location of the computing device 120 is outside the institution that issued the computing device 120 to the minor user 110.

In one or more embodiments, the location module 480 determines a current geographic location for the computing device 120 by examining its IP address. For example, the location module 480 can include a list of IP addresses associated with the institution that issued the computing device 120 to the minor user 110. The location module 480 can detect an IP address currently used by the computing device 120 to communicate on the network 140 and if it is an IP address not associated with the institution that issued the computing device 120 then it can be concluded that the computing device 120 is located outside of the institution that issued the computing device 120.

In one or more embodiments, the location module 480 determines a current geographic location for the computing device 120 by employing a web-based geo-location service that analyzes messages from the computing device 120 to determine its geographic location. The location module 480 can compare the current geographic location of the computing device 120 to the geographic location of the institution that issued the computing device 120 to the minor user 110 to determine whether or not the computing device 120 is currently located inside or outside of the institution.

In one or more embodiments, the location module 480 determines a current geographic location for the computing device 120 by employing a GPS mechanism in the computing device 120. The location module 480 can compare the current geographic location reported by the GPS mechanism inside the computing device 120 to the geographic location of the institution that issued the computing device 120 to the minor user 110 to determine whether or not the computing device 120 is currently located inside or outside of the institution.

The location detection by the location module 480 can be selected to be natively supported by the computing device 120 and one or more web browsers that can be run on the computing device 120. This can minimize barriers to location-based parental controls that might otherwise be imposed on the parent 112 or the minor user 110. For example, no software installation is imposed on the parent 112 to track the location-usage of the computing device 120 by their minor user 110 when a geo-location service or device GPS or IP tracking is used by the location module 480.

Figure 5:
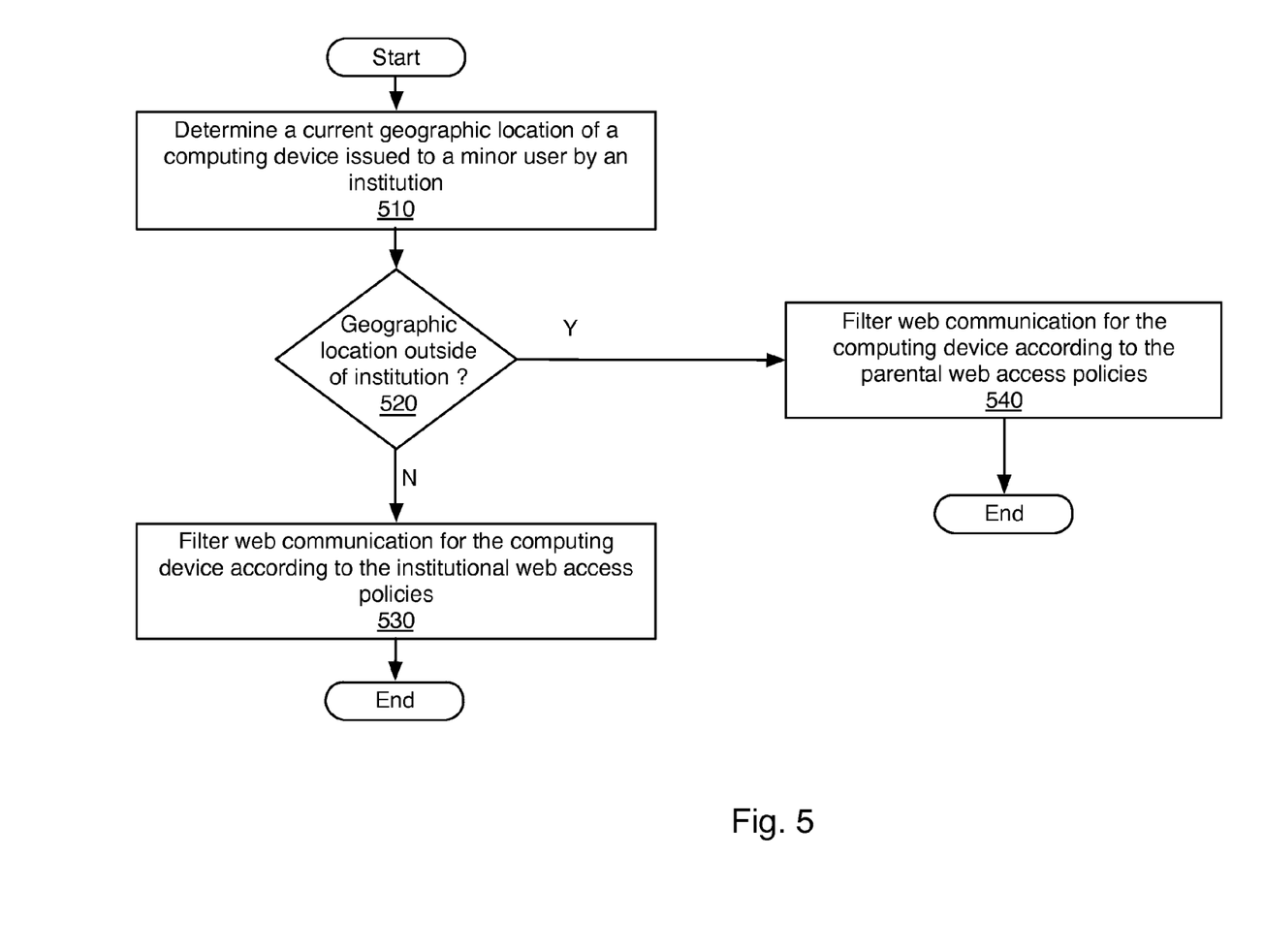
FIG. 5 shows how a web filtering mechanism determines which set of web access policies, the institutional policies or the parental policies, are to be applied to a computing device in one or more embodiments.

FIG. 5 shows how the web filtering mechanism 100 determines which set of policies, the parental web access policies 160 or the institutional web access policies 162, are to be applied to the computing device 120 in one or more embodiments. At step 510, the web filtering mechanism 100 determines a current geographic location of the computing device 120. Step 510 can include determining a precise geographic location, e.g., using a web-based geo-location service or a GPS mechanism in the computing device 120, or determining a current IP address being used by the computing device 120.

At step 520, the web filtering mechanism 100 determines whether or not the current geographic location of the computing device 120 is outside of the institution that issued the computing device 120 to the minor user 110. The determination at step 520 can be based on any geographic location measure, e.g., latitude/longitude, street address, etc., or on a comparison between the current IP address of the computing device 120 and the IP addresses associated with the institution that issued the computing device 120 to the minor user 110.

If the current geographic location of the computing device 120 is not outside of the institution that issued the computing device 120 to the minor user 110 at step 520, then at step 530 the web filtering mechanism 100 filters web communication for the computing device 120 by applying the institutional web access policies 162. Otherwise, at step 540 the web filtering mechanism 100 filters web communication for the computing device 120 by applying the parental web access policies 160.

Figure 6:
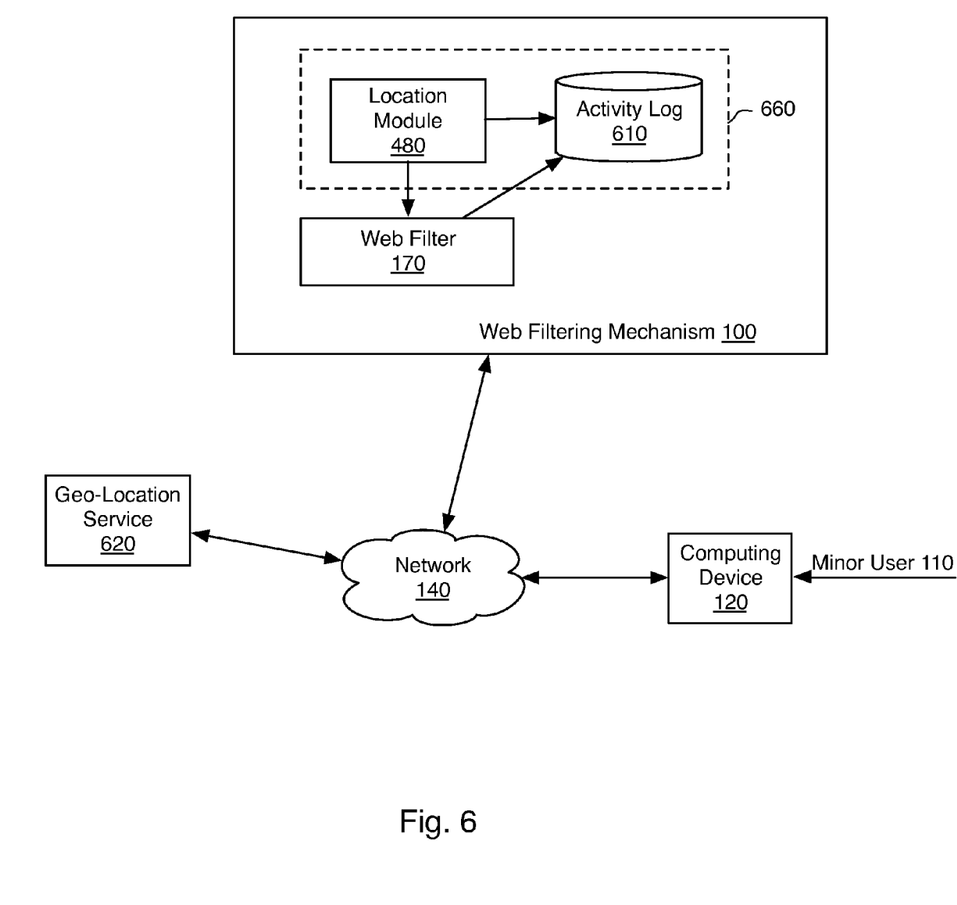
FIG. 6 shows one or more embodiments of a web filtering mechanism with integrated parental reporting.

FIG. 6 shows one or more embodiments of the web filtering mechanism 100 integrated with a reporting mechanism 660 including an activity log 610. The activity log 610 records a set of web accesses undertaken with the computing device 120. The activity log 610 can also record the current geographic locations of the computing device 120 when the recorded web accesses were undertaken. The activity log 610 can be used to provide reports to the parent 112 about what web sites the minor user 110 has accessed from what location.

The web filtering mechanism 100 can employ a geo-location service 620 to determine the current geographic location of the computing device 120. The geo-location service 620 can obtain consent for location tracking from the minor user 110 before tracking the location of the computing device 120. The location module 480 can then at any time obtain the current geographic location of the computing device 120 from the geo-location service 620, e.g., using IP/web communication via the network 140.

Figure 7:
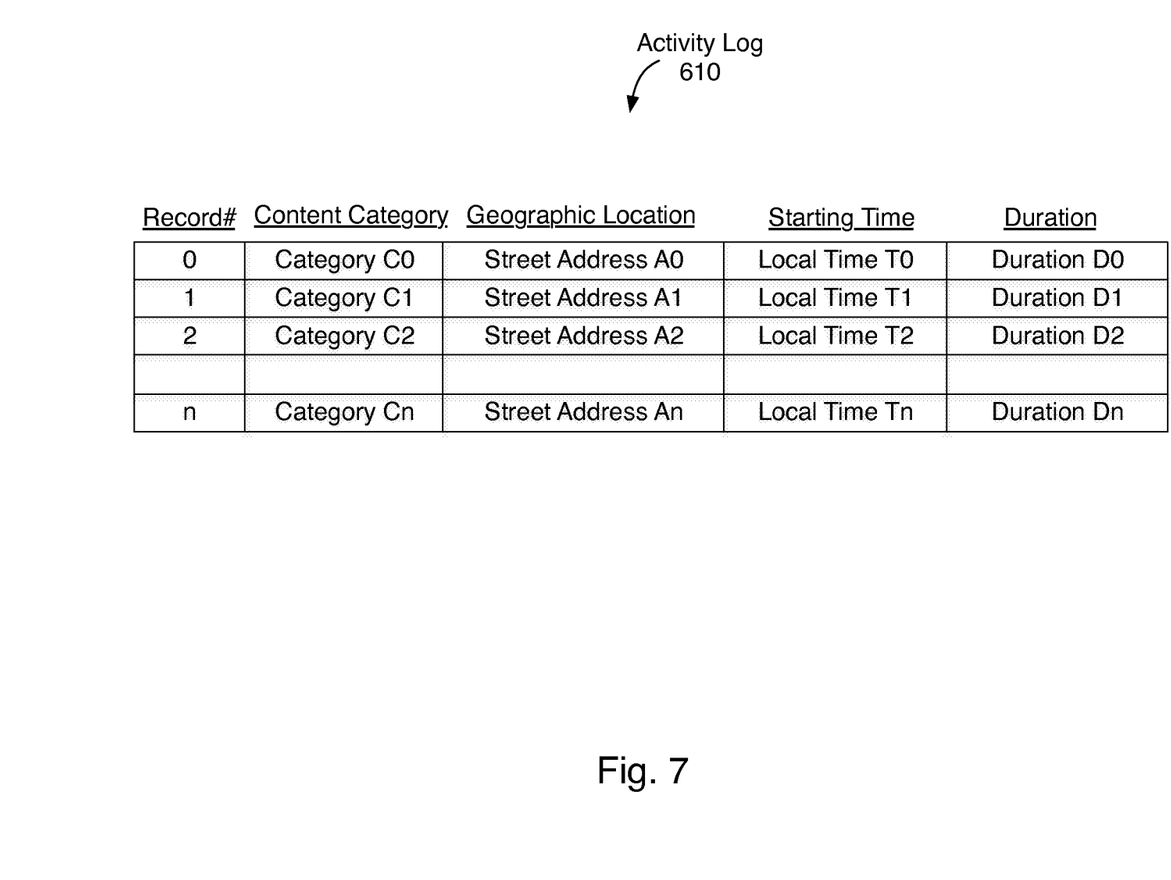
FIG. 7 illustrates an activity log in one or more embodiments.

FIG. 7 illustrates the activity log 610 in one or more embodiments. The activity log 610 includes a set of records 0-$n$. Each record 0-$n$ can describe a web access undertaken by the minor user 110 via the computing device 120. Each record 0-$n$ in one ore more embodiments can include a content category C0-Cn, a street address A0-An, a starting time T0-Tn, and a duration D0-Dn. The content categories C0-Cn describe the content being accessed, e.g., social network, gaming, adult, etc. The street addresses A0-An are the geographic locations of the computing device 120 during the corresponding web accesses. The starting times T0-Tn and the durations D0-Dn are the starting time and durations for the corresponding web accesses.

Figure 8:
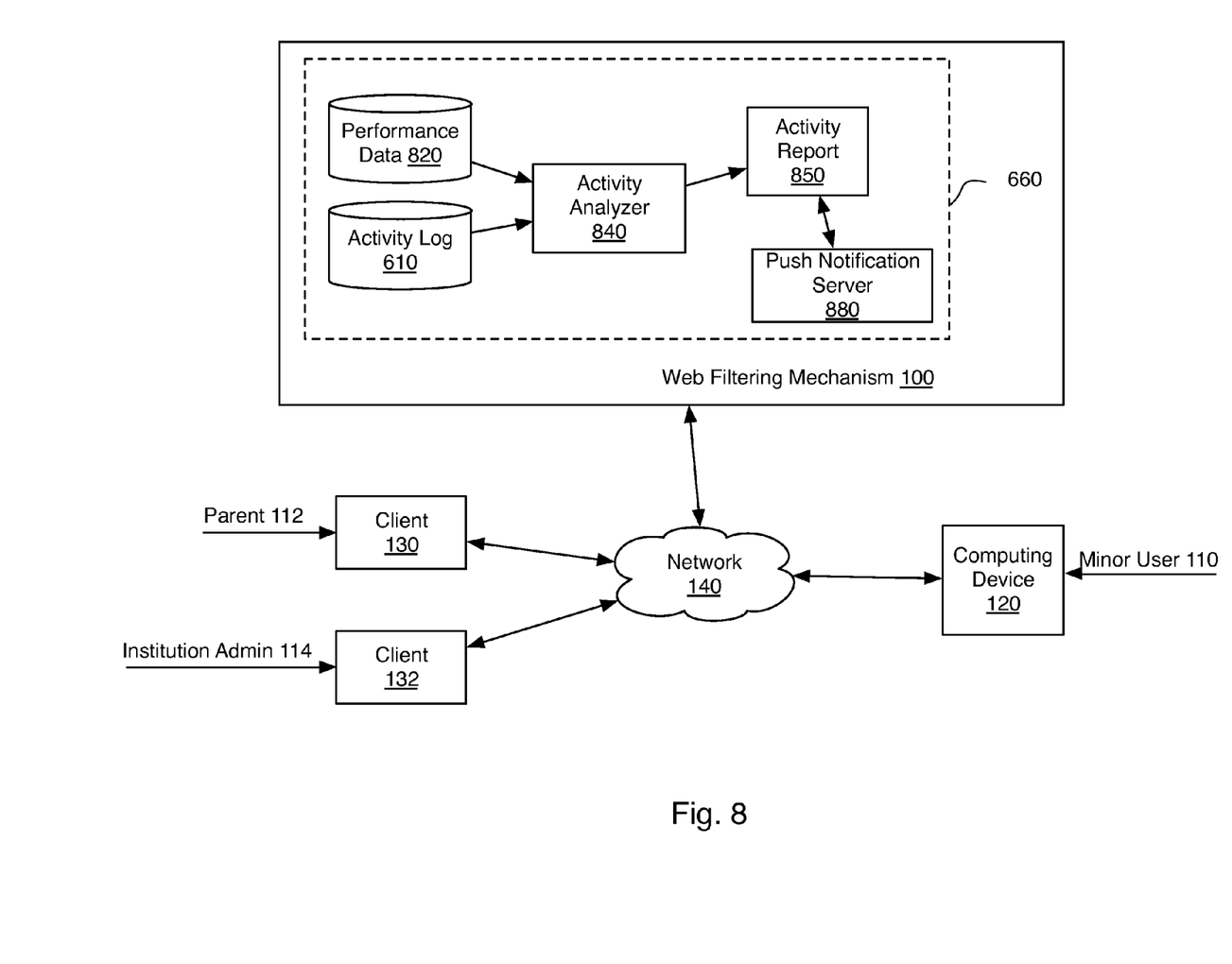
FIG. 8 shows an activity analyzer in a reporting mechanism in one or more embodiments.

FIG. 8 shows an activity analyzer 840 in the reporting mechanism 660 in one or more embodiments. The activity analyzer 840 generates an activity report 850 from the information in the activity log 610. The activity analyzer 840 can generate any type of report, table, chart, graph, etc. that depicts the information in the activity log 610. For example, the activity analyzer 840 can generate a pie chart that depicts the percentage of time that the minor user 110 spends on each of the content categories recorded in the activity log 610.

The activity analyzer 840 can generate the activity report 850 in one or more embodiments by correlating the information in the activity log 610 with information contained in a performance data store 820. The performance data store 820 can hold performance data pertaining to the minor user 110, e.g. test grades. The activity analyzer 840 can generate activity reports that link test grades to web access activity logged in the activity log 610. For example, large amounts of time logged on social networking before a test period can be correlated to resulting test performance.

In one or more embodiments, the reporting mechanism 660 includes a push notification server 880 that can send the parent 112 the activity report 850 in an email message. The push notification server 880 can regularly send activity reports, e.g., weekly reports, so that the parent 112 can track how much time the minor user 110 is spending on the categories that the parent 112 currently allows. The regular reports can enable the parent 112 to adjust their choices on content categories accordingly. In one or more embodiments, activity reports can be sent to a mobile device of the parent 112, e.g. the client 130 or another device that runs a mobile app for receiving activity reports from the push notification server 880.

Figure 9:
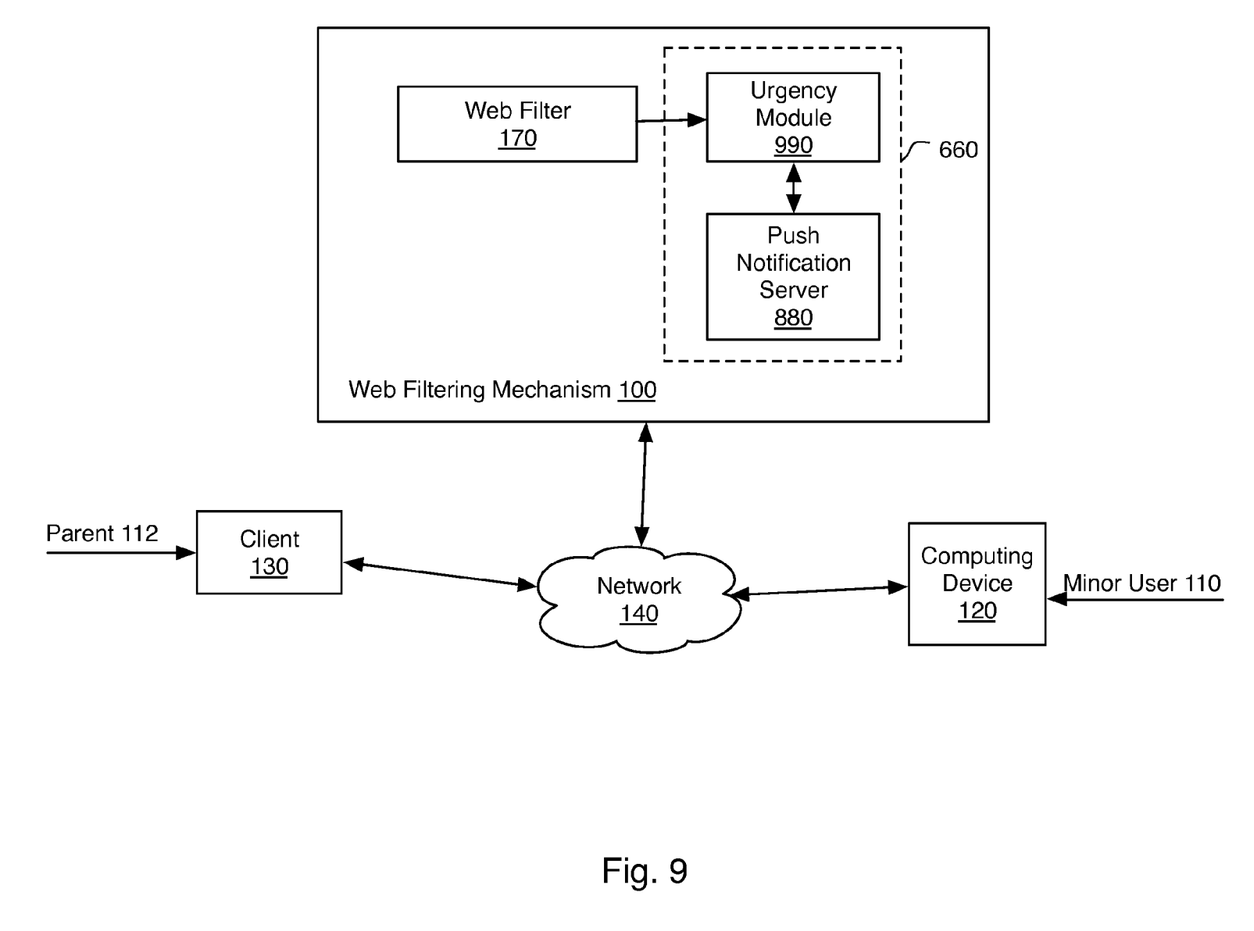
FIG. 9 shows an urgency module in a reporting mechanism in one or more embodiments.

FIG. 9 shows an urgency module 990 in the reporting mechanism 660 in one or more embodiments. The urgency module 990 detects a potential for harm to the minor user 110 by examining the web content accessed using the computing device 120 and sends an urgent message to the parent 112 if the potential for harm is detected. The urgency module 990 obtains an information stream from the web filter 170 that includes text associated with web content accessed by the minor user 110 via the computing device 120. The text from the web filter 170 can include search terms typed into search engines, content of instant messages, text extracted from web sites visited by the minor user, etc. The urgency module 990 examines the information stream for key words, phrases, etc., that can indicate interactions by the minor user 110 with potential predators, bullies, etc., as well as conditions that may cause the minor user 110 to engage in self-harm. When the urgency module 990 detects a potential for harm to the minor user 110 it sends an urgent message via the push notification server 880 to the parent 112 informing the parent 112 of the potential danger. The urgent message can be a text or other instant message to a mobile device of the parent 112.

Figure 10:
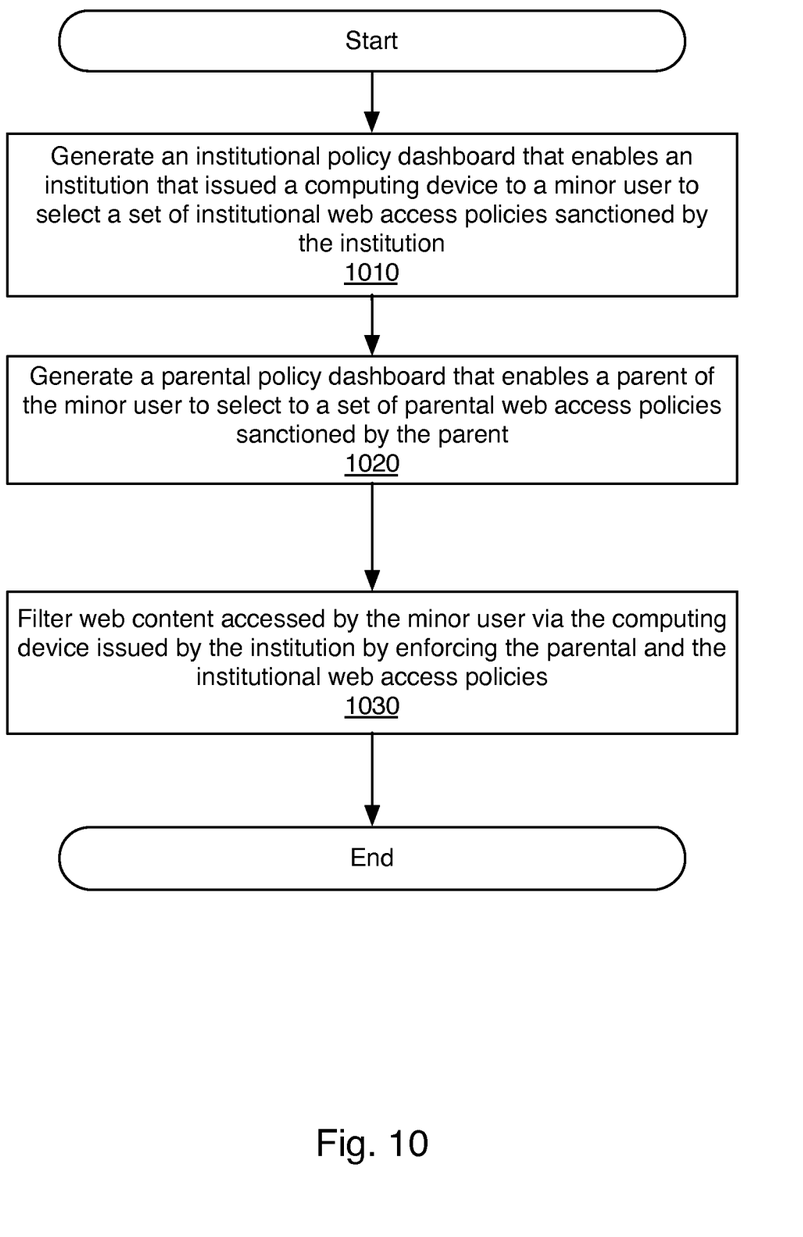
FIG. 10 illustrates a method for web filtering integrated with parental management in one or more embodiments.

FIG. 10 illustrates a method for web filtering integrated with parental management in one or more embodiments. While the various steps in this flowchart are presented and described sequentially, one of ordinary skill will appreciate that some or all of the steps can be executed in different orders and some or all of the steps can be executed in parallel. Further, in one or more embodiments, one or more of the steps described below can be omitted, repeated, and/or performed in a different order. Accordingly, the specific arrangement of steps shown in FIGS. 10-11, and FIG. 5, should not be construed as limiting the scope of the invention.

At step 1010, an institutional policy dashboard is generated. The institutional policy dashboard enables an institution that issued a computing device to a minor user to select a set of institutional web access policies sanctioned by the institution.

At step 1020, a parental policy dashboard is generated. The parental policy dashboard enables a parent of the minor user to select to a set of parental web access policies sanctioned by the parent.

At step 1030, web content accessed by the minor user via the computing device issued by the institution is filtered by enforcing the parental and the institutional web access policies. The parental web access policies can be enforced over the institutional web access policies if the parental web access policies and the institutional web access policies conflict at step 1030.

Figure 11:
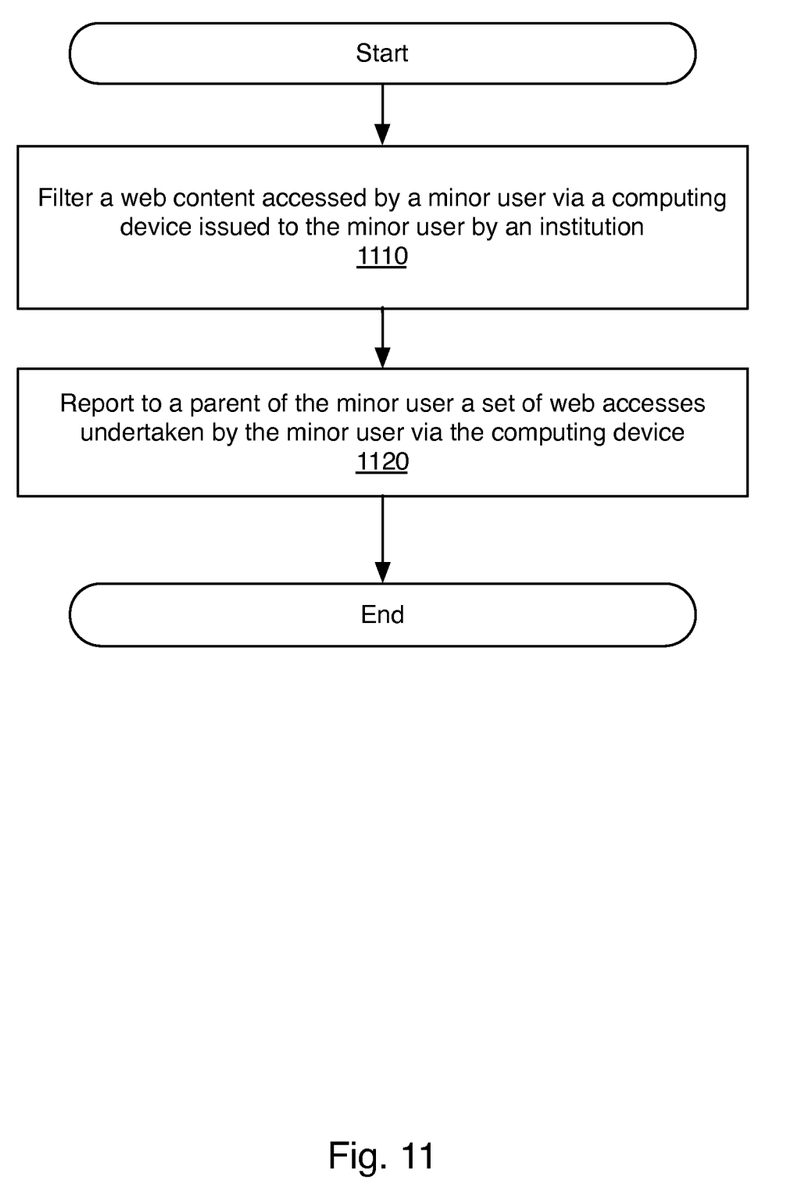
FIG. 11 illustrates a method for web filtering integrated with parental reporting in one or more embodiments.

FIG. 11 illustrates a method for web filtering integrated with parental reporting in one or more embodiments. At step 1110, a web content accessed by a minor user via a computing device issued to the minor user by an institution is filtered. At step 1120, a set of web accesses undertaken by the minor user via the computing device is reported to the parent of the minor user.

Embodiments of the invention may be implemented on a specialized computer system. Examples of such a computing system can include one or more mobile devices (e.g., laptop computer, smart phone, personal digital assistant, tablet computer, or other mobile device, game console), desktop computers, servers, blades in a server chassis, or any other type of computing device(s) that include at least the minimum processing power, memory, and input and output device(s) to perform one or more embodiments of the invention.

Figure 12:
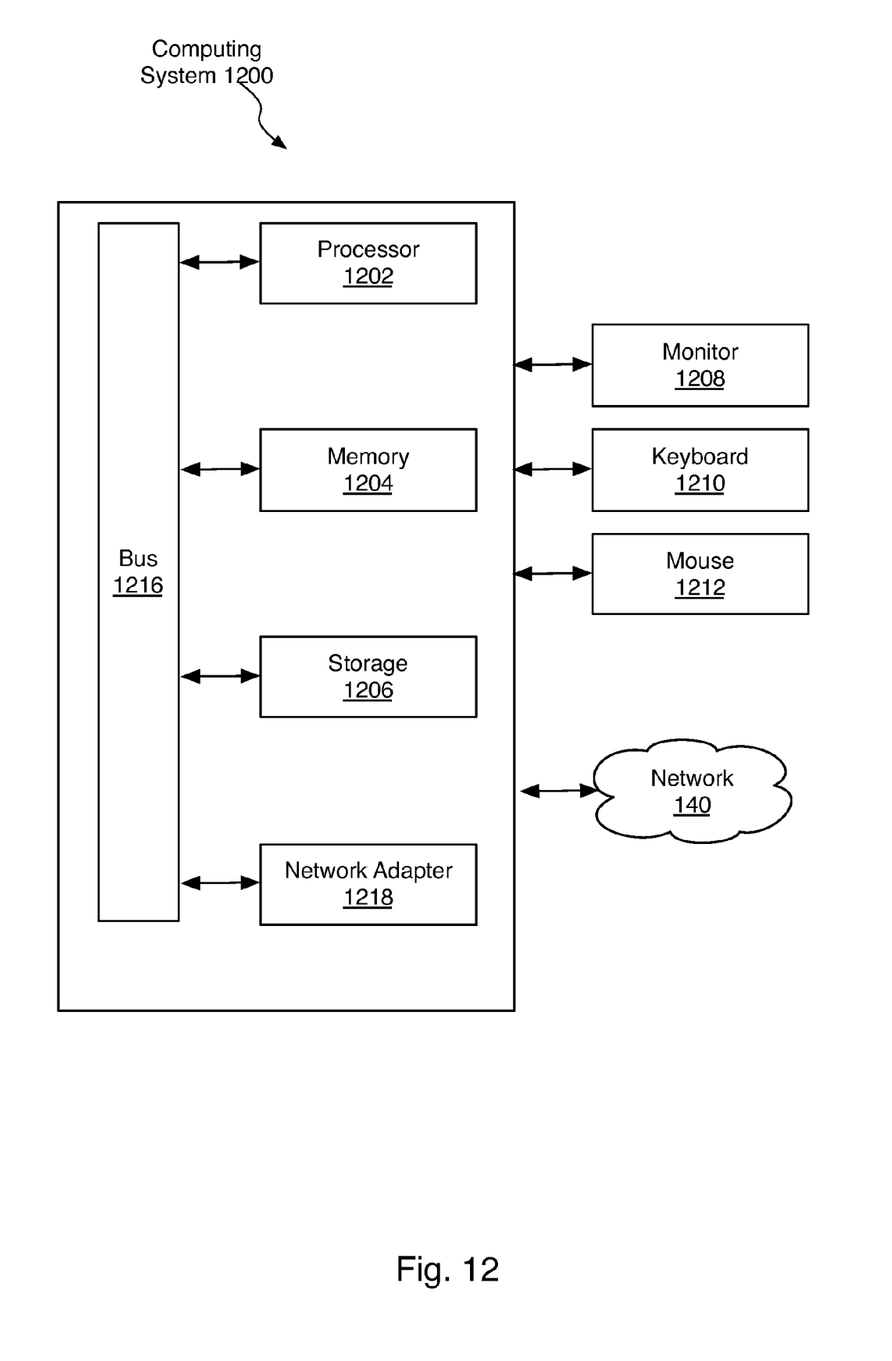
FIG. 12 illustrates a computing system upon which portions of a web filtering mechanism or clients thereof can be implemented.

FIG. 12 illustrates a computing system 1200 upon which portions of the web filtering mechanism 100 or the clients 130-132 or the computing device 120 can be implemented. The computing system 1200 includes one or more computer processor(s) 1202, associated memory 1204 (e.g., random access memory (RAM), cache memory, flash memory, etc.), one or more storage device(s) 1206 (e.g., a hard disk, an optical drive such as a compact disk (CD) drive or digital versatile disk (DVD) drive, a flash memory stick, etc.), a bus 1216, and numerous other elements and functionalities. The computer processor(s) 1202 may be an integrated circuit for processing instructions. For example, the computer processor(s) may be one or more cores or micro-cores of a processor. The computing system 1200 may also include one or more input device(s), e.g., a touchscreen, keyboard 1210, mouse 1212, microphone, touchpad, electronic pen, or any other type of input device. Further, the computing system 1200 may include one or more monitor device(s) 1208, such as a screen (e.g., a liquid crystal display (LCD), a plasma display, touchscreen, cathode ray tube (CRT) monitor, projector, or other display device), external storage, input for an electric instrument, or any other output device. The computing system 1200 may be connected to the network 140 (e.g., a local area network (LAN), a wide area network (WAN) such as the Internet, mobile network, or any other type of network) via a network adapter 1218.

While the foregoing disclosure sets forth various embodiments using specific diagrams, flowcharts, and examples, each diagram component, flowchart step, operation, and/or component described and/or illustrated herein may be implemented, individually and/or collectively, using a range of processes and components.

The process parameters and sequence of steps described and/or illustrated herein are given by way of example only. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While the invention has been described with respect to a limited number of embodiments, those skilled in the art, having benefit of this disclosure, will appreciate that other embodiments may be devised which do not depart from the scope of the invention as disclosed herein.

What is claimed is:

1. A web filtering mechanism, comprising:
a hardware processor;
a web filter executing on the hardware processor and configured to enable the computer processor to filter a web content accessed by a minor user associated with an institution;
an urgency module executing on the hardware processor and configured to enable the computer processor to detect a potential for harm to the minor user by examining a set of text associated with the web content; and
a push notification server executing on the hardware processor and configured to enable the hardware processor to notify a parent of the minor user of the potential for harm;
an institutional policy dashboard executing on the hardware processor and configured to enable the hardware processor to enable the institution to select a set of institutional web access policies sanctioned by the institution and enforced by the web filter;
a parental policy dashboard executing on the hardware processor and configured to enable the hardware processor to enable the parent to override one or more of the institutional web access policies; and
an activity log for recording a geographic location for each web access undertaken by the minor user.

2. The web filtering mechanism of claim 1, wherein the urgency module detects the potential for harm by examining a search term entered by the minor user into a search engine.

3. The web filtering mechanism of claim 1, wherein the urgency module detects the potential for harm by examining a content of a message for the minor user.

4. The web filtering mechanism of claim 1, wherein the urgency module detects the potential for harm by examining a set of text extracted from a web site accessed by the minor user.

5. The web filtering mechanism of claim 1, wherein the urgency module detects the potential for harm by detecting one or more keywords in the web content that indicate the potential for harm.

6. The web filtering mechanism of claim 1, wherein the urgency module detects the potential for harm by detecting one or more phrases in the web content that indicate the potential for harm.

7. The web filtering mechanism of claim 1, wherein the push notification server notifies the parent using a message to a mobile device of the parent.

8. The web filtering mechanism of claim 1, further comprising an activity analyzer executing on the hardware processor and configured to enable the computer processor to generate an activity report for the parent indicating the web content accessed by the minor user.

9. A method for web filtering, comprising:
filtering by a web filter a web content accessed by a minor user associated with an institution;
detecting by an urgency module a potential for harm to the minor user by examining a set of text associated with the web content; and
notifying by a push notification server a parent of the minor user of the risk of potential harm;
generating an institutional policy dashboard that enables the institution to select a set of institutional web access policies sanctioned by the institution;
generating a parental policy dashboard that enables the parent to override one or more of the institutional web access policies; and
recording a geographic location for each web access undertaken by the minor user.

10. The method of claim 9, wherein detecting a potential for harm to the minor user comprises examining a search term entered by the minor user into a search engine.

11. The method of claim 9, wherein detecting a potential for harm to the minor user comprises examining a content of a message for the minor user.

12. The method of claim 9, wherein detecting a potential for harm to the minor user comprises examining a set of text extracted from a web site accessed by the minor user.

13. The method of claim 9, wherein detecting a potential for harm to the minor user comprises detecting one or more keywords in the web content associated with the risk of potential harm.

14. The method of claim 9, wherein detecting a potential for harm to the minor user comprises detecting one or more phrases in the web content associated with the risk of potential harm.

15. The method of claim 9, wherein notifying the parent comprises sending a message to a mobile device of the parent.

* * * * *